United States Patent
Sagi et al.

[15] 3,665,770
[45] May 30, 1972

[54] TEMPERATURE INDICATOR

[72] Inventors: Zsigmond Sagi, Parsippany, N.J.; Berel Weinstein, New York, N.Y.

[73] Assignee: Bio-Medical Sciences, Inc., Fairfield, N.J.

[22] Filed: July 24, 1970

[21] Appl. No.: 58,001

[52] U.S. Cl. ................................. 73/356, 73/358, 116/114.5
[51] Int. Cl. ................................. G01k 11/08, G01k 11/16
[58] Field of Search ................. 73/356, 358; 116/114.5, 106

[56] References Cited

UNITED STATES PATENTS

| | | | |
|---|---|---|---|
| 3,243,303 | 3/1966 | Johnson | 73/356 |
| 3,175,401 | 3/1965 | Geldmacher | 73/358 |
| 3,465,590 | 9/1969 | Kluth | 73/358 |
| 3,059,474 | 10/1962 | Keller | 73/358 |
| 2,938,384 | 5/1960 | Soreng | 73/358 |

*Primary Examiner*—Louis R. Prince
*Assistant Examiner*—Denis E. Corr
*Attorney*—Watson, Leavenworth & Kelton

[57] ABSTRACT

A thermometer is provided comprising a heat conductive carrier on which there are one or more temperature sensitive regions comprising temperature responsive substances having preselected and relatively precise points at which a temperature induced change in state will begin to occur. In multiple region systems, the regions are spaced apart and the substances are successively graduated with respect to the points. Included is a coloration or other indicator means and a material so positioned with respect to the temperature responsive substance and the indicator means as to be capable of incorporating or otherwise demonstrably responding to the indicator means as a result of the initiation of a temperature responsive change in the temperature responsive substance.

16 Claims, 6 Drawing Figures

Patented May 30, 1972

TEMPERATURE INDICATOR

BACKGROUND

1. Field of the Invention

The invention relates to thermometers and particularly to thermometers in which a temperature responsive change in state of a temperature responsive substance may be manifested either reversibly or irreversibly.

More specifically, the invention is directed to a thermometer having one or more regions which contain one or more substances having pre-selected and precise points, such as a melting point, at which a temperature induced change in state will occur. The substances in the multiple region thermometers are graduated so as to permit the indication, as a result of temperature responsive changes in one or more of the regions of the temperature of the body under test.

2. Prior Art

Heretofore, attempts to devise thermometers of the above type have resulted in products that have critical deficiencies, among which is the failure to indicate adequately the precise temperature of the test subject because of the inherent inability of the temperature responsive substances employed in those products to maintain their change of state or to indicate properly that a change of state has, in fact, occurred. Furthermore, such products have often lacked versatility in that a temperature responsive change in state necessarily resulted in an irreversible indicator manifestation.

SUMMARY OF THE INVENTION

A further deficiency of the prior art thermometer of the type mentioned generally above has been the inadequate thermal conductivity of the carrier for the temperature responsive substances. In certain applications, (e.g., oral use), this inadequacy has required a sufficiently prolonged duration of time in the mouth as to discourage the use of the thermometer and to increase the probability of low readings.

An object of the present invention is to overcome the above deficiencies in a novel, unobvious, simple and effective manner.

According to the invention, the initiation of a change in state of the temperature responsive substance is accompanied by a corresponding cooperation between the indicator and an acceptor material which preferably overlies or covers the temperature responsive substance and indicator in such a manner as to permit a permanent and accurate record of the temperature at which the change in state occurred.

Another object of the invention is to avoid the thermal conductivity deficiency by the provision of a carrier which not only provides structural integrity for the thermometer (and can be formed, if desired, with cavities which securely contain the temperature responsive substance) but which also has high thermal conductivity to provide rapid and uniform temperature conduction to the substance. In a particularly advantageous embodiment, the carrier is a thin metallic member which may, if desired, be covered on opposite surfaces by thin plastic films. It will be recognized that the structural integrity and the thermal conductivity of the carrier need only be consistent with the requirements, e.g. time, imposed by the intended use of the product.

The details of the invention will become more evident from the detailed description to follow with reference to the appended drawing.

DETAILED DESCRIPTION

Figure 1:
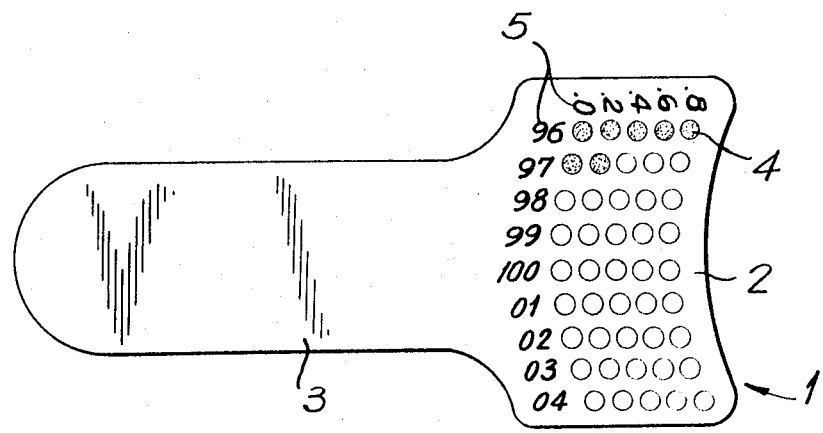
FIG. 1 is a plan view of a thermometer according to one embodiment of the invention.

In FIG. 1 is shown a thermometer having a first portion 2, adapted to be inserted into the mouth for the purpose of oral temperature measurement. The thermometer has a second portion 3 which serves as a handle for manipulation purposes.

The portion 2 is provided with a number of regions 4 distributed thereon and each of these regions is intended to respond to the temperature of the subject under examination by a visible, or other wise demonstrable, change at a particular temperature so that by means of indicia 5 on the thermometer the temperature of the subject or the highest temperature to which the thermometer has been exposed correspond to the last temperature sensing substance to register the change. In FIG. 1, the discoloration in seven regions 4 indicates a temperature of 97.2° F.

Although thermometers of this general type are known, the various means, which have been employed to produce the above-noted visible change and to preserve this change over an extended period of time, have not been notably successful.

The present invention solves the problems of producing an effective visible change and maintaining such change for an extended time and, further, provides for a permanent and accurate record. Moreover, this is advantageously achieved in a simple manner at a relatively small production cost so as to justify a one-time or disposable type use for each thermometer, although thermometers of the invention may be used for successive applications to measure and record temperatures of successively higher magnitudes. In addition, the invention provides assurance that ambient temperatures cannot result in premature and irreversible indicator changes.

Figure 2:
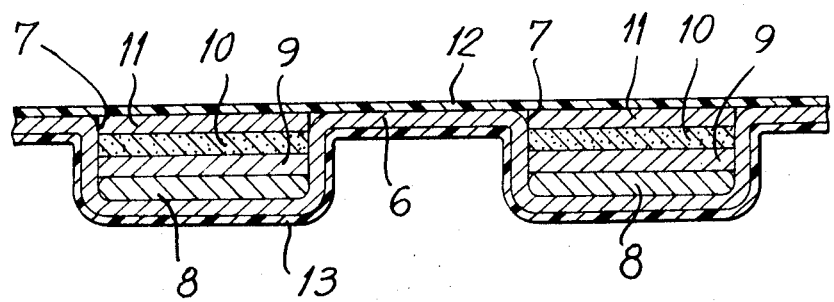
FIG. 2 is a sectional view on enlarged scale taken along line 2—2 in FIG. 1.
Figure 3:
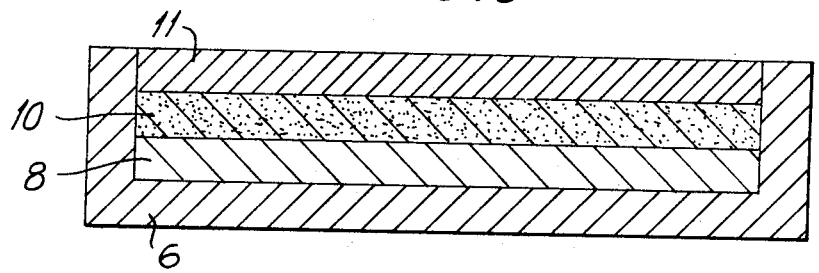
FIG. 3 is a sectional view of another embodiment of the invention.
Figure 4:
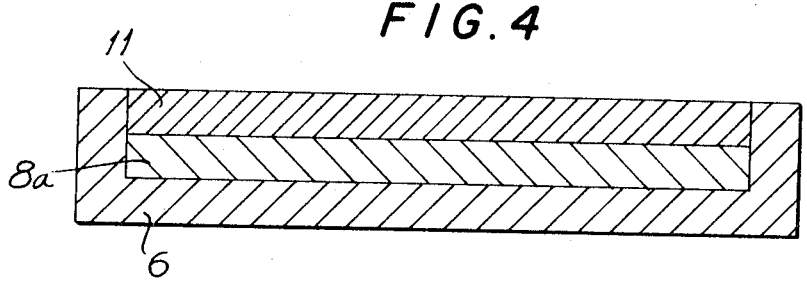
FIG. 4 is a sectional view through still another embodiment.
Figure 5:
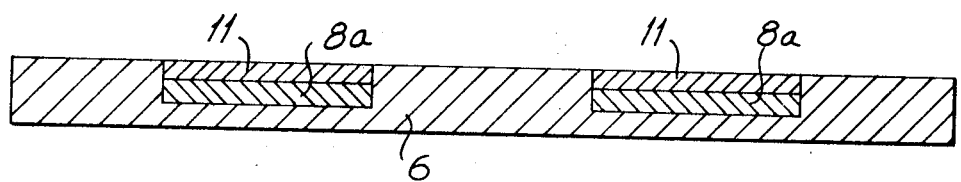
FIG. 5 is a sectional view through a further embodiment.

The cross-section of FIG. 2 shows that the thermometer provided in accordance with the first embodiment of the invention comprises a carrier 6 provided with cavities 7 at each of said regions 4. For purposes of clarity in illustration, these cavities are shown with greatly exaggerated depth. Contained in each cavity 7 is a solid mass 8 of a substance of precise, predetermined point of commencement of melt, the substances being such that these melt points are graduated in the respective cavities for a purpose to be explained later. Superposed on the mass 8 in each cavity are a separator layer 9, a porous dye layer 10, and an opaque web layer 11. An arrangement of this type is especially useful when the mass 8 and the dye in dye layer 10 are substances which are incompatible or unstable in intimate admixture or in direct contact in pre-use conditions. Where the dye is compatible and stable in admixture with mass 8, it may be so admixed as indicated at 8a in FIGS. 4 and 5, and layers 9 and 10 may be omitted. Alternatively, when the dye and mass 8 form an unstable or incompatible admixture, but the dye when incorporated into dye layer 10 is compatible with mass 8, layer 9 may be omitted (see FIG. 3).

The mass 8 and the layer or layers thereon are sealed in each cavity by a transparent or translucent cover film 12 which is in sealed contact with the carrier 6 around the cavities. The cover film 12 extends in a plane above the cavities. A further cover film 13 is applied to the rear surface of the carrier 6 to complete the thermometer.

One of the problems associated with oral use of the known thermometers is the need for holding the thermometer in the mouth for a protracted period in order to insure uniform temperature characteristics throughout the various temperature sensitive substances 8. The invention provides a solution to this problem as the carrier 6 is constructed of an efficient heat conducting material. In a particularly effective embodiment, the carrier is constituted of aluminum or alloys thereof. Thereby, the carrier is provided with the necessary strength to serve as the main structural body of the support while at the same time providing rapid and uniform temperature distribution throughout the thermometer. As a consequence, the time required for taking temperature is substantially diminished.

The films 12 and 13 are preferably constituted of an inert material which keeps the aluminum carrier 6 out of contact with the inside of the mouth to prevent any unpleasant taste or electrolytic effects. Such films may, for example, be made of an inert resin such as Mylar or the like. In non-biologic uses of the thermometer, such films may be omitted.

The dye layer 10 of FIG. 1, for example, may contain a dyestuff which is responsive to a change in the physical state of the substance of mass 8. As the substance undergoes initial melting, the dye layer 10 becomes wetted, resulting in the substantially instantaneous migrations of dye from layer 10 to acceptor layer 11, thereby producing a visual record of a change of state. Since this change of state is directly related to the known initial melting points of the substances of mass 8 which have commenced to melt the temperature of the body corresponds to the last substance to have evidenced commencement of melt. The greater the intensity of the visible change of appearance in layer 11, the greater the ease in reading the thermometer. In one preferred embodiment, the change in appearance in layer 11 is from white to intense blue, or different colors for different ranges of temperature on the thermometer.

Heretofore, attempts to use melting point characteristics of chemicals have been frustrated by the need for melting to have, at least substantially, gone to completion before an accurate reading could be taken. The instantaneous change of appearance at the onset of melting of substance 8 overcomes this problem. Moreover, once the dye has migrated to layer 11, the change is permanent and irreversible. In the absence of the dye and with the use of conventional melting point substances, initial melting is frequently associated with instant recrystallization when the thermometer is removed from the heated environment, thereby altering the temperature reading. Also, with conventional substances, it is necessary that the substance in each cavity be substantially completely molten before it can be used as an effective indicator. This, therefore, requires predetermined precision in points of completion of melt, which presents problems technologically and in quality control. Furthermore, different quantities of substances in different pockets will result in different time periods necessary for completion of change of state. By contrast, the amount of heat required to initiate change of state is minimal, and the points are precise and controllable. Numerous substances will satisfy the need for graduated initial melting points, for example, solid solutions obtainable from 1-bromo, 2-nitrobenzene and 1-chloro-2-nitrobenzene.

Variation of the respective amounts of the substances in the solution will render a range of the initial melting points of the resulting solution. Further to the examples given herein above with respect to layer 8, a wide variety of other substances unrelated to solid solutions may be employed incorporating a range of melt points. Thus, for example, different substances for the layer 8 in each cell may be selected by their respective initial melt points.

The porous layer 9 can be a conventional filter paper which serves as a mechanical, inert separator between the dye layer 10 and the substance 8. The layer 9 acts as a barrier to migration where necessary between the substance 8 and the dye layer 10 before the substance 8 melts.

The dye layer 10 is constituted as a porous material impregnated with a dyestuff. The dyestuff is preferably soluble in the molten substance 8 so as to facilitate migration of the dye to layer 11. Dyestuffs suitable with the above indicated solid solution of halogenated nitrobenzenes are Croceine Scarlett SS and Polynal Blue B, both manufactured by the Allied Chemical Co. These dyes are stable over long periods of time. Methyl violet is a dyestuff that is compatible with mass 8. The use of methyl violet, therefore, in admixture with mass 8 or incorporated into dye layer 10, eliminates the need for layers 9 and 10 in the admixture situation and layer 9 in the incorporation situation.

Layer 11 is a material capable of registering an observable change as a result of the migration of dyestuff from layer 10. Layer 11 may be constituted of the conventional absorbent laboratory filter paper.

Figure 6:
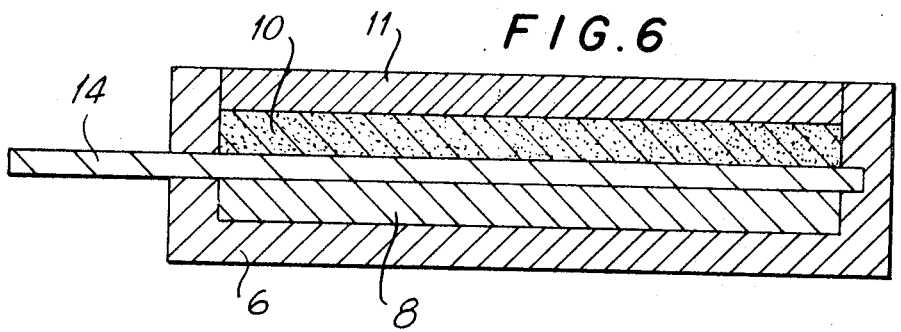
FIG. 6 is a sectional view through yet another embodiment.

In the embodiment shown in FIG. 6, a removable barrier 14 is interposed between the substances of mass 8 and the dye layer 10 to prevent molten substance from interacting with the dyestuff. This barrier has the effect of preventing premature, irreversible triggering of the thermometer. Such a barrier, in the form of a pull tab for example, can be removed just prior to use. When this barrier is employed, the fact that the substances may have melted and recrystallized prior to actual use will not adversely affect the operation of the thermometer.

The film 12 may be adhesively or thermally joined to the carrier 6 in the region outside the cavities to insure hermetic sealing of the individual cavities with the substance 8 and the sandwich of layers 9-11 therein.

The operation of the thermometer is as follows:

The handle portion 3 is held between the fingers and the portion 2 is inserted into the mouth and preferably held under the tongue for a relatively short period. During this time, all the masses 8 in the cavity which have melting points below the temperature in the mouth will melt and the molten substances will flow by capillary absorption through their respective separator layers into the dye layer 10 to dissolve the dyestuff which then migrates to absorbent layer 11 to indicate visibly a change of state. This change of state is permanent and irreversible and when the user removes the termometer, the last cavity to show change of state will indicate the oral temperature.

It is seen from the above, therefore, that a temperature indicator has been disclosed which comprises the carrier 6 which the cavities 7 therein and with individual means 8 in said cavities having precise and respective melting points. A cover means in the form of the opaque and absorbent layer 11 covers the means 8 and a coloration means in the form of dye layer 10 is disposed in the cavity beneath layer 11 and includes the dyestuff which is soluble in means 8 when molten, to be absorbed therewith into the cover means to visibly indicate change of state.

Although the invention has been described with reference to specific embodiments thereof, numerous variations and modifications will become evident to those skilled in the art without departing from the scope and spirit of the invention as defined by the appended claims.

What is claimed is:

1. A thermometer for measuring the temperature of a test subject, said thermometer comprising a heat-conductive carrier comprising at least one thermally responsive means responsive to a predetermined and substantially precise temperature at which a thermally induced change of state begins to occur, indicator means operatively associated with said thermally responsive means and adapted to be wet thereby when said thermally responsive means is in a fluid phase, and means cooperating with said indicator means for indicating the attainment of said substantially precise temperature upon the formation of only sufficient amount of fluid resulting from said change of state to thereby wet the indicator means.

2. The thermometer of claim 1 wherein said heat-conductive carrier comprises spaced cavities containing thermally responsive means responsive to different temperatures.

3. The thermometer of claim 2 wherein indicia relate to said cavities corresponding to different temperatures.

4. The thermometer of claim 2 comprising transparent means overlying said indicator means and sealing and isolating each of said cavities from one another.

5. The thermometer of claim 2 wherein said indicator means comprises a layer of material impregnated with a dye.

6. The thermometer of claim 1 wherein said thermally responsive means is a solid solution.

7. The thermometer of claim 1 wherein said indicator means comprises a dye adapted to give color indication of the change of state of said thermally responsive means.

8. The thermometer of claim 1 comprising a removable barrier means interposed between said thermally responsive means and said indicator means thereby preventing contact between said thermally responsive means and said indicator means until said removable barrier means is removed.

9. A thermometer for measuring the temperature of a test subject, said thermometer comprising a heat-conductive carrier comprising at least one thermally responsive means responsive to a predetermined and substantially precise temperature at which a thermally induced change of state begins to occur, indicator means operatively associated with and responsive to the change of state of said thermally responsive means, and means cooperating with said indicator means to permit measuring the temperature of said test subject at the onset of the change in state of said thermally responsive means.

10. The thermometer of claim 9 wherein said heat-conductive carrier comprises spaced cavities containing thermally responsive means responsive to different temperatures.

11. The thermometer of claim 10 wherein indicia relate to said cavities corresponding to different temperatures.

12. The thermometer of claim 10 comprising transparent means overlying said indicator means and sealing and isolating each of said cavities from one another.

13. The thermometer of claim 10 wherein said indicator means comprises a layer of material impregnated with a dye.

14. The thermometer of claim 9 wherein said thermally responsive means is a solid solution.

15. The thermometer of claim 9 wherein said indicator means comprises a dye adapted to give color indication of the change of state of said thermally responsive means.

16. The thermometer of claim 9 comprising a removable barrier means interposed between said thermally responsive means and said indicator means thereby preventing contact between said thermally responsive means and said indicator means until said removable barrier means is removed.

* * * * *